(No Model.) 2 Sheets—Sheet 1.

L. DANNHAUSER.
BRIDLE.

No. 455,472. Patented July 7, 1891.

Witnesses
Geo. W. Breck.
Henry D. Williams

Inventor
Louis Dannhauser
By his Attorneys
Witter & Kenyon.

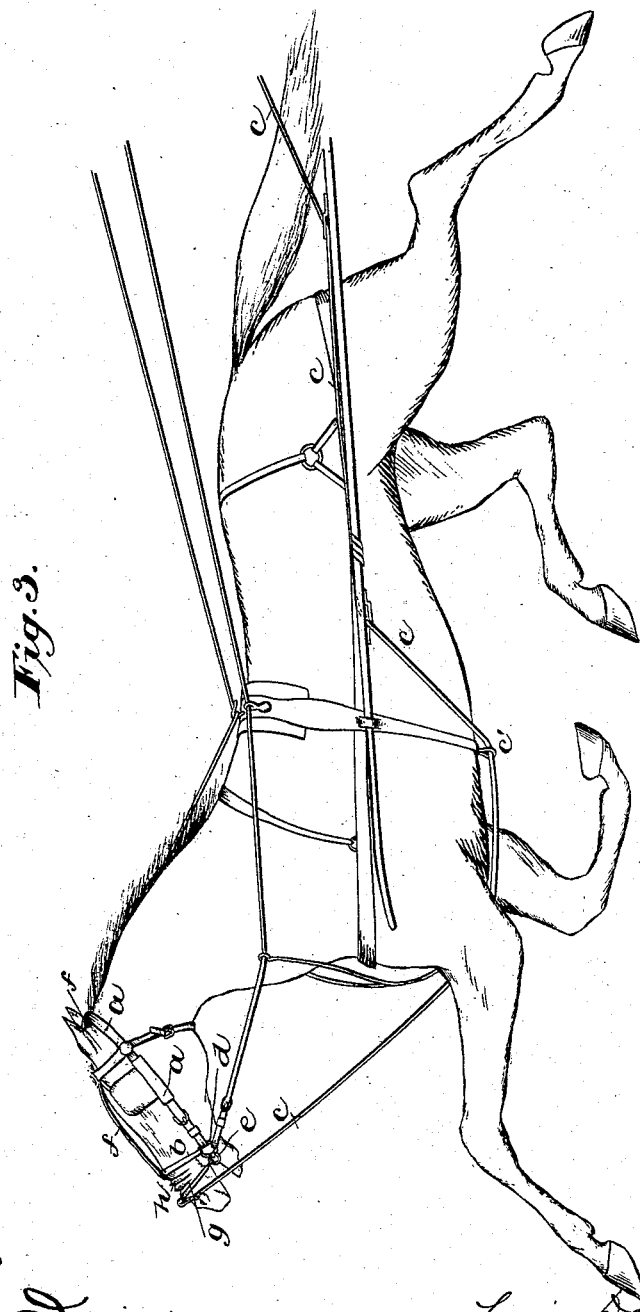

UNITED STATES PATENT OFFICE.

LOUIS DANNHAUSER, OF MUNICH, GERMANY.

BRIDLE.

SPECIFICATION forming part of Letters Patent No. 455,472, dated July 7, 1891.

Application filed April 7, 1891. Serial No. 388,036. (No model.)

*To all whom it may concern:*

Be it known that I, LOUIS DANNHAUSER, a citizen of the United States, and a resident of Munich, Bavaria, Germany, have invented certain new and useful Improvements in Harness, of which the following is a specification, reference being had to the accompanying drawings, forming part hereof.

This invention relates to harness for horses and other animals of draft; and it consists of a certain improved construction of such harness, whereby horses may be effectually prevented from running away. This object is accomplished by providing means for imparting a strong tension to the head of the animal and pulling and holding his head down and at the same time checking or stopping his breathing by closing or partly closing his mouth and nostrils. The means for closing the mouth and nostrils consists of a bag of air-tight and elastic material and of an additional rein or reins for closing it over the mouth and nostrils of the animal, and the additional reins which operate the bag are also adapted to exert a strong tension upon the head of the animal and to pull and hold down the head of the animal.

Figure 1:
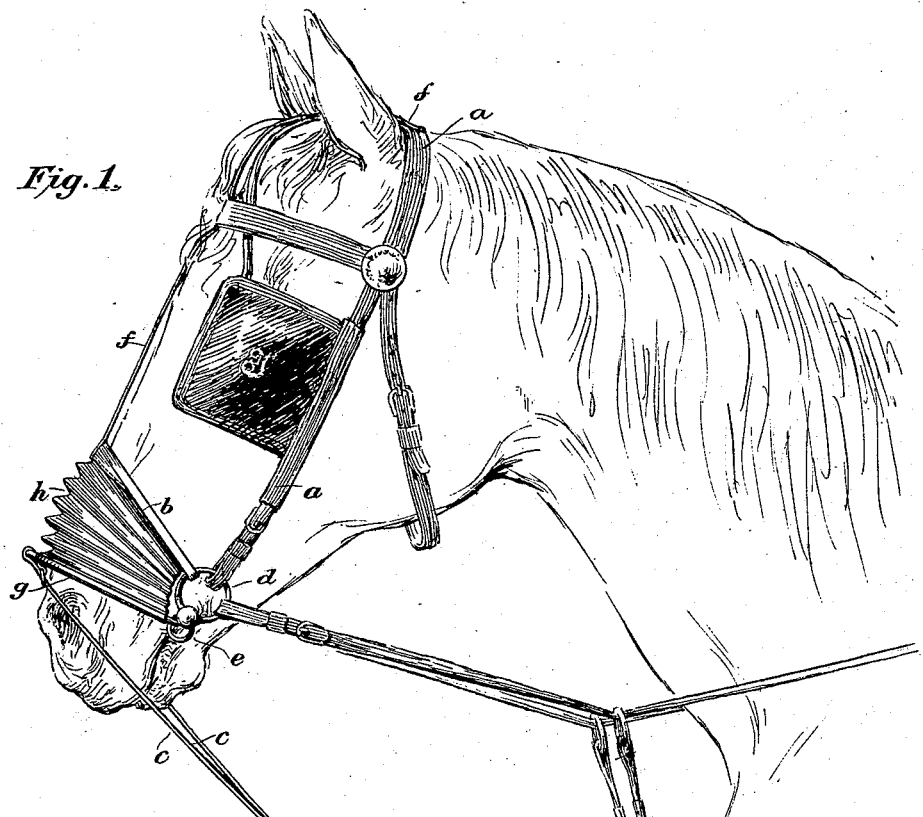
Figure 2:
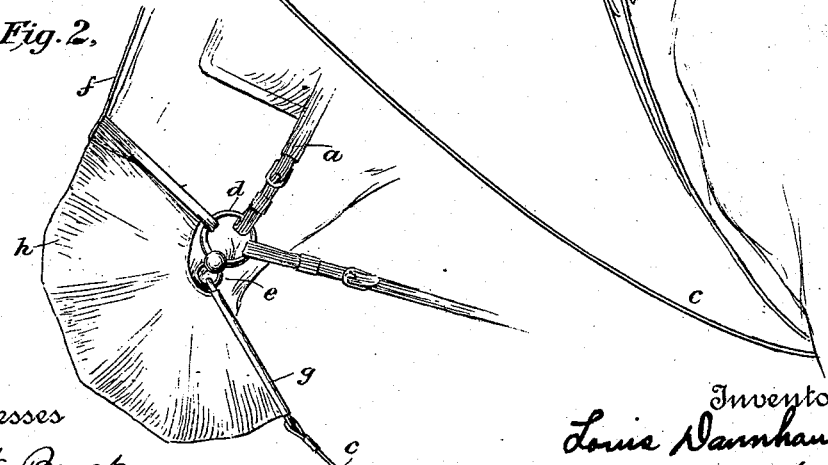

In the accompanying drawings, Figure 1 is a side view showing my improved harness in place upon a horse. Fig. 2 is a side view showing the bag closed over the mouth and nose of the animal. Fig. 3 is a side view showing more completely the additional operating-rein.

My improvements are adapted to be applied to and used in connection with an ordinary harness, but necessitate slight changes in the construction of the parts thereof.

A bridle is shown in the accompanying drawings constructed according to my invention, and its headstall is lettered $a$. A strap or band $b$, extending over the nose of the animal, is provided, and this strap is connected to an additional rein or reins $c$, passing under the body and between the fore legs of the animal and through a ring $c'$ (see Fig. 3) or other guide at the belly-band of the harness, and thence to the shaft or traces, along which it is guided and brought into the carriage in convenient proximity to the driver. In the construction shown the strap $b$ is attached at each end to one of the snaffles $d$ of the harness. The strap $b$ is connected by a suitable strap $f$ with the top of the headstall $a$, so as to hold it in position. Another band or strap $g$ is provided attached to rings $e$, of which rings there are two, one being attached to or forming part of each snaffle $d$ of the harness, and the strap $g$ is attached to these rings $e$, so that it will turn freely upon them, and to this strap $g$ are attached the two reins $c\ c$, which reins are joined into a single rein $c$, that passes under the body between the fore legs, as above described. When the device is in the position shown in Fig. 1, as it will be under ordinary circumstances, the strap $g$ extends around above the nose of the animal. Upon the application of a strong tension to the rein $c$ the strap $g$ will be pulled down into the position shown in Fig. 2. A bag $h$, of rubber or other suitable air-tight and elastic material, is attached to the straps $b$ and $g$, so that when the strap $g$ is pulled down, as in Fig. 2, this bag will cover the nostrils and partly cover the mouth of the animal, and thus effectually prevent its breathing. This cutting off of the wind of the animal in conjunction with the heavy tension holding down its head, will quickly bring the animal to a standstill, and thus effectually stop a runaway.

It is evident that various slight modifications may be made in the construction of the various parts of my invention without departing from my improvement.

What I claim, and desire to secure by Letters Patent, is—

1. The combination, with an animal's bridle and ordinary reins, of a strap adapted to pass around the nose of the animal, a bag of air-tight material connected thereto and adapted to be extended or pulled over the nostrils of the animal, and an additional rein attached to the free end of such bag, substantially as set forth.

2. The combination, with an animal's bridle, of the straps $b$ and $g$, adapted to pass around the nose of the animal, the strap $f$, joining the strap $b$ to the headstall, the bag $h$, connected to the straps $b$ and $g$, and a rein or reins connected to the strap $g$, substantially as set forth.

3. The combination, with an animal's bridle, of the straps $b$ and $g$, adapted to pass around the nose of the animal, the strap $f$, joining the strap $b$ to the headstall, the bag $h$, connected to straps $b$ and $g$, the rein $c$, connected to the strap $g$, and the guide-ring $c'$, substantially as set forth.

LOUIS DANNHAUSER.

Witnesses:
 HENRY D. WILLIAMS,
 WILBUR B. DRIVER.